(12) United States Patent
Tagge et al.

(10) Patent No.: US 7,048,794 B2
(45) Date of Patent: May 23, 2006

(54) ORGANIC-INORGANIC COMPOSITE

(75) Inventors: Christopher D. Tagge, San Carlos, CA (US); Jacob Freas Pollock, Berkeley, CA (US); Ken Saito, Berkeley, CA (US)

(73) Assignee: Innovative Construction and Building Materials, LLC, Emeryville, CA (US)

(*) Notice: Subject to any disclaimer, the term of this patent is extended or adjusted under 35 U.S.C. 154(b) by 0 days.

(21) Appl. No.: 10/952,122

(22) Filed: Sep. 27, 2004

(65) Prior Publication Data

US 2005/0126437 A1    Jun. 16, 2005

Related U.S. Application Data

(60) Provisional application No. 60/603,491, filed on Aug. 20, 2004, provisional application No. 60/528,595, filed on Dec. 10, 2003, provisional application No. 60/553,423, filed on Mar. 15, 2004.

(51) Int. Cl.
*C04B 24/10* (2006.01)
*C04B 28/10* (2006.01)
*C08L 3/04* (2006.01)
*C08L 3/06* (2006.01)
*C08L 3/08* (2006.01)

(52) U.S. Cl. ............... 106/804; 106/779; 106/207.1; 106/217.01; 106/780; 106/805; 106/162.81

(58) Field of Classification Search ............ 106/779, 106/780, 804, 805, 207.1, 217.01, 162.81
See application file for complete search history.

(56) References Cited

U.S. PATENT DOCUMENTS

| | | | | |
|---|---|---|---|---|
| 2,388,543 | A | * | 11/1945 | Hoggatt ............. 106/649 |
| 3,414,467 | A | * | 12/1968 | Ferrara ............. 428/533 |
| 3,462,283 | A | | 8/1969 | Hjermstad et al. |
| 3,672,922 | A | | 6/1972 | Brouilliard et al. |
| 4,505,775 | A | | 3/1985 | Harding et al. |
| 5,104,731 | A | | 4/1992 | Gager |
| 6,113,923 | A | | 9/2000 | Le Bourhis |
| 6,846,856 | B1 | | 1/2005 | Soane et al. |
| 6,902,797 | B1 | | 6/2005 | Pollock et al. |
| 2002/0128352 | A1 | | 9/2002 | Soane et al. |

\* cited by examiner

*Primary Examiner*—David M. Brunsman
(74) *Attorney, Agent, or Firm*—Christopher Paradies; Fowler White Boggs Banker, P.A.

(57) ABSTRACT

An inorganic-organic composite comprises an inorganic phase, such as gypsum crystals, and a film forming organic phase. The film forming organic phase is selected from substituted starches having a degree of polymerization; degree of substitution and viscosity such that the substituted starches are insoluble in water during mixing but dissolve at a higher processing temperature during forming, setting or drying of the composite. Thus, excessive migration of the substitute starch is prevented and the composite is substantially strengthened.

30 Claims, 2 Drawing Sheets

─◆─ Acid-mod ─■─ HE starch ─◆─ Hydrophobic SE ─◉─ HPMC

ORGANIC-INORGANIC COMPOSITE

CROSS-REFERENCE TO RELATED APPLICATION

The present application claims the benefit of previously filed, U.S. Provisional Patent Applications Ser. No. 60/603,491, filed Aug. 20, 2004, Ser. No. 60/528,595, filed Dec. 10, 2003, and Ser. No. 60/553,423, filed Mar. 15, 2004 and incorporate by reference the contents therein.

The present application claims the benefit of previously filed Provisional Patent Application Ser. No. 60/603,491, filed Aug. 20, 2004, and incorporates by reference the contents therein.

FIELD OF THE INVENTION

The field of the invention relates to organic-inorganic composites for low-cost, fire-retardant building materials and the like.

BACKGROUND

Substituted starches are starch derivatives that have been chemically reacted to replace one or more of the hydroxyl functional groups. Typically, the process involves etherification or esterification of a starch or modified starch which append ether or ester linkages along the starch polymer backbone. This process differs from more traditional modifications made to starches such as oxidization, acid-thinning, cross-linking, and pre-gelatinization. The starch may come from one of many natural sources, such as potato, tapioca, or corn. In fact, any of numerous starches are well known and commercially available in a variety of forms, including liquids, particles and fine powders. A substituted starch may also be modified in another way, such as acid-thinning, prior to or after substitution with one or more types of functionalities. For example, substituent groups may be alkyl as in methyl or ethyl substitution, hydroxyalkyl as in hydroxyethyl, hydroxymethyl, or hydroxypropyl substitution, hydrophobic, cationic, anionic, or combinations of these. Regardless, methods of preparing substituted starches is well known.

Acid-thinned or pre-gelatinized starches are sometimes added to wallboard core formulations to improve the bonding of the wallboard core to the paper facing. These starches typically migrate to the surface or are applied directly to the surface of the wallboard core. In conventional wallboard, the paper facing resists most of the stress, and a reliable bond between the paper facing and the wallboard core is essential to obtain strength and durability of a wallboard. Also, it is well known and accepted that such starches do little or nothing to significantly strengthen the wallboard core.

Indeed, most starches either do not dissolve and disperse in the inorganic matrix or migrate efficiently to the surfaces during drying. Thus, such starches serve no known role in strengthening the wallboard core. Even starches that remain predominantly dispersed throughout the composite do not adequately bind the discrete inorganic phase, which may be of any morphology, including needle-like crystals, particulates, or fibers. Many attempts have been made to find an inexpensive and useful additive for strengthening the wallboard core, but such attempts have failed to provide properties that are substantially better than conventional wallboard.

SUMMARY

A substituted starch reinforced composite comprises a discrete inorganic phase and a polymeric phase which includes a substituted starch. It is believed that the microstructure of the composite is controlled to produce an inorganic phase reinforced by a percolating, polymeric film including a substituted starch without limiting the claims in any way. For example, a substituted starch, such as hydroxyethylated, hydroxypropylated, or acetylated starch, is selected having a degree of substitution that makes the substituted starch insoluble in cold water. The starch is dispersed by mixing. For example, the substituted starch may be mixed as a dry powder with powdered calcium sulfate hemihydrate prior to mixing with excess water to form a flowable slurry. Subsequently, during drying, the temperature of the slurry increases and the substituted starch, which is mostly undissolved, begins to dissolve in the excess water. The substituted starch remains in the gypsum core and deposits on the hydrated inorganic phase during drying. A substituted starch, such as a starch-ether or starch-ester, acts as an efficient binder for the discrete inorganic phase, such as gypsum crystals that form during hydration of calcium sulfate hemihydrate with small additions of the substituted starch.

It is an object to provide a composite with an intimate dispersion and interaction of inorganic and organic components. An advantage is that low additive levels of organic components significantly increases the strength and nail pull resistance of the composite while keeping the costs of the composition of matter in a range that is commercially advantageous. Another advantage is that the weight of the composite can be reduced without sacrificing strength, allowing for decreased production costs.

In one example, substituted starches are selected that possess good film-forming properties and hydrophilic properties which result in intimate interaction between the organic and inorganic phases. The substituted starch composition thoroughly penetrates the inorganic matrix and strongly adheres to and binds the inorganic phase.

It is another object is to provide an enhanced stucco slurry that has low viscosity during mixing and forming. For example, by delaying dissolution of a starch additive until the temperature of the slurry is increased to the dissolution point, the viscosity of the slurry remains low until setting and drying of the wallboard. In one example, a starch-based polymer with a low degree of substitution is used to delay dissolution until the temperature is raised during the setting and drying portion of the process used to form the article made of the composition of matter. An advantage is that the delayed dissolution prevents the slurry from clogging or sticking to manufacturing equipment. Another advantage is that the composition of matter has a molecular dispersion of the polymer, which remains throughout the inorganic matrix of the article upon drying of the composite. Yet another advantage is that the polymer is less likely to migrate to the surface of the composite, where it is unavailable for improving the strength of the core.

Other features and advantages will become apparent from the following description which refers to the accompanying drawings.

DETAILED DESCRIPTION

The following examples do not exclude other solutions that are based on the teachings in the Summary. Instead, the following merely provide some of the examples of specific embodiments.

Certain substituted starches can greatly enhance the strength of a gypsum wallboard core. Most starches, including traditional wallboard starches and many substituted starches, do not substantially increase the strength of a gypsum-based construction material. Herein, substantially increasing the strength by including any additive means that a flat, one-half inch thick sample of a paperless core has at least a 10% increase in nail pull resistance or flexural strength with addition of an additive compared to the same density of paperless core made without the additive.

For example, starches may be selected that have a particular molecular weight and type and degree of substitution which result in efficient distribution throughout and intimate interaction with the inorganic composite. The resulting substituted starch reinforced composite has improved hardness and strength, which is an excellent combination for improving nail pull resistance. In addition, the toughness of the sample does not diminish with increasing additive in the sample. Thus, wallboard with such a substituted starch reinforced core has improved nail pull resistance and hardness.

In some examples, substituted starches used in the composite have solubility characteristics that allow full dissolution in the inorganic core without migration to surfaces during the production process. For example, the substituted starch may be of an hydroxyethyl starch with a low degree of substitution, e.g. less than 0.3 DS, which is insoluble in cold water. Cold water is the expression used to relate to the processing temperature of the water during mixing, which is less than the temperature of the composite material during setting and/or drying. In one wallboard manufacturing process, the starch is added as a dried powder, preferably with the other dry ingredients, prior to mixing with water and wet components. The starch remains undissolved during mixing, forming, and setting, and therefore does not significantly affect slurry viscosity or stucco hydration, which allow all of the various wallboard manufacturing processes to be used with little or no modification. The substituted starch dissolves, forms an aqueous molecular dispersion, and evenly deposits throughout the gypsum matrix during setting and drying phases of the process, as the temperature of the wallboard increases above the dissolution point, allowing the starch additive to reinforce the composite by forming a molecular network.

Figure 1:
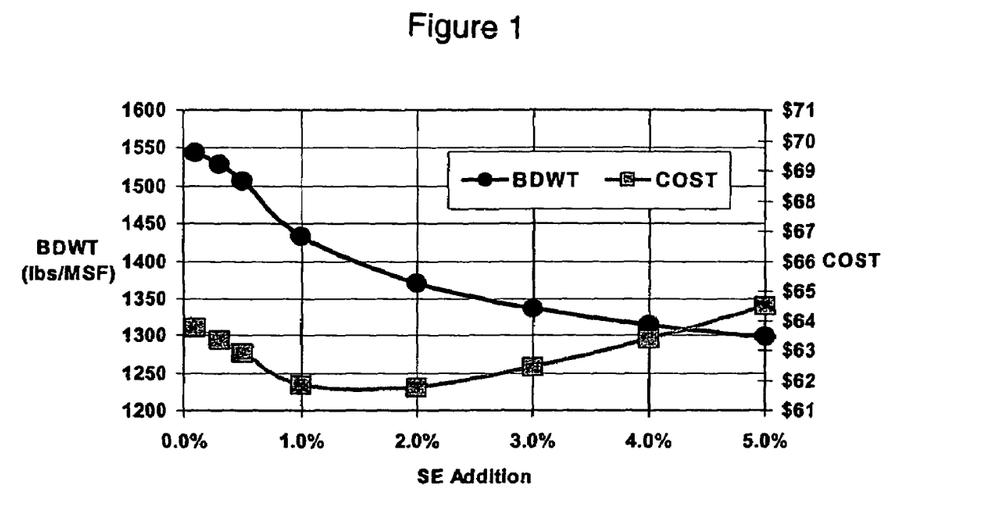
FIG. 1 shows a graph of the board weight (BDWT) in pounds (lbs) per million square feet (MSF) versus the weight percent of starch ether addition that achieves a desired strength requirement, which is superimposed on a graph of the relative cost of the board in dollars versus the weight percent of starch ether (SE) addition.
Figure 2A:
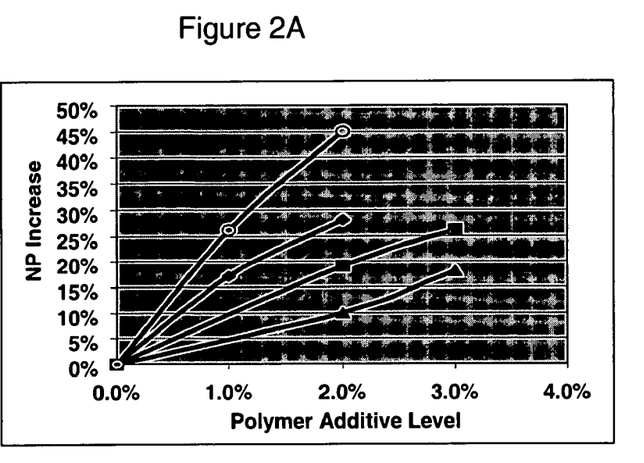
FIG. 2A compares the relative increase in nail pull resistance at a specific board weight versus weight percent additive (Additive Level) for an acid-modified starch (Acid-mod), an hydroxyethyl starch ether (HE Starch), a hydrophobic starch ether (Hydrophobic SE), and a hydroxypropylmethyl cellulose (HPMC).
Figure 2B:
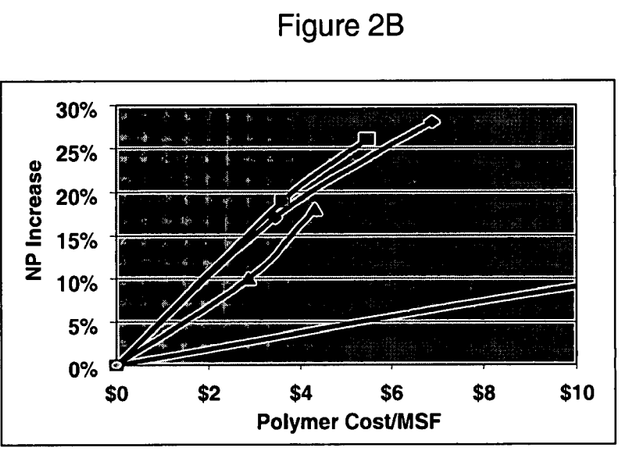
FIG. 2B compares the relative percent increase in nail pull resistance at a specific board weight versus additional cost per million square feet (Cost/MSF) for the same additives as compared in FIG. 2A.

Polysaccharides other than starch may be used, so long as the distribution in the core material, the interaction of the polysaccharides with the inorganic composite and the migration of the polysaccharides in the core material are similarly controlled. However, as show in FIG. 2B, substituted starches cost less, which provides a significant commercial advantage.

The control of the degree of substitution and dissolution temperature is important in selecting reinforcing additives. The additives should readily dissolve at some point during the process of forming an article of manufacture, but the amount of migration, after dissolution of the additive, should be limited. Thus, the additive is substantially retained within the core of the article of manufacture, where it can strengthen the composite.

For example, wallboard drying typically involves passing wet boards through a multi-stage drying kiln, resulting in heat and mass transfer through board. As heat from the kiln enters the board, the excess water increases in temperature and evaporates. Water vapor, or steam, escapes predominantly through the faces of the board, usually through heavy wallboard paper. Therefore, throughout the drying process, the particular temperature and moisture profile through the thickness of the board varies. In one example, a substituted starch is selected that responds to changes in temperature and moisture to form a continuous, fine film throughout the wallboard core during the drying process. Most of the additive is retained in the wallboard core.

A substituted starch may come from any native starch source, initially. Starches from various sources have different granule sizes, degrees of polymerization (DP), and ratios of amylose (linear starch) to amylopectin (branched starch). DP refers to the average number of anhydroglucose units per starch molecule. Dent corn, waxy maize, or potato starch are preferred due to cost considerations. Dent corn and potato starch are predominantly amylopectin with native potato starch having more amylose and a higher DP. Waxy maize corn is 100% amylopectin. Special hybrid corn species produce high amylose starch which may also be substituted. Starches of high DP are preferably acid-thinned prior to substitution in order to obtain the proper viscosity characteristics.

Substituted starches may be cold water insoluble, meaning that they do not increase solution viscosity until heated past their gel temperatures. The response in viscosity of a particular starch to cooking is often characterized by viscoanalysis: a starch dispersion under shear is heated to and held at 90–95 C for a given period of time and is then cooled to 35–50 C while measuring viscosity throughout the process. Different types of modified and substituted starches have a wide range of viscosity profiles measured by viscoanalysis (RVA). Typical response to cooking involves granule swelling as the starch is heated, granular burst and molecular dispersion during heating or cooking, and viscosity increase and starch re-association upon cooling. Several points on the viscosity profile can be used to characterize the starch These are gel temperature, peak viscosity, trough viscosity (holding strength), and final viscosity (see figure). Starch viscosity profiles are also influenced by shear rate, pH, salts, and particulates.

Different types of starch modification and substitution may be used to adjust the viscosity characteristics for particular applications. In one composition, the hydroxyl groups of the starch are substituted with another group connected by an ester or ether linkage. Some preferred substituents due to availability, cost, and performance are hydroxypropyl, hydroxyethyl, acetyl, hydrophobic, anionic, and cationic. While these substitutions result in starches with different molecular compositions, they share some characteristics. In general, substitution accomplishes: decrease in gel temperature; decrease in the time and temperature range over which the starch granules swell and burst, releasing starch molecules into solution; altered ratio between peak, trough, and final viscosity; and reduced tendency to retrograde (set-back). All of these effects tend to improve film forming ability. Starches used in the inventive compositions have improved film flexibility and strength compared to modified and unmodified starches. It is believed that substituted starches may have an altered balance of hydrophobicity and hydrophilicity, improving affinity and adhesion to inorganic phases in the matrix of the article of manufacture.

For example, starch may be substituted with particular substituent groups to various degrees by altering reaction conditions. The degree of substitution is usually expressed as either DS, the number of hydroxyl groups replaced per anhydroglucose unit, or weight percent, the total weight of the substituent units divided by the total weight of the polymer. Both refer to the average amount of substitution, as the actual substitution may vary among hydroxyl location as well as along the starch chain and between starch molecules. The DS of the starch in the inventive compositions is critical to strength enhancement. Starches with a low DS do not have the lower gel point and trough viscosity that leads to proper dissolution and dispersion. Also, starches with a high DS become cold water soluble and affect slurry viscosity and stucco hydration. Starches with the optimum DS have viscosity characteristics and hydrophobic/hydrophilic balance that give the most favorable interaction with the inorganic matrix of the composite. In one embodiment, the substituted starch has a degree of substitution no greater than 6 weight percent, which substantially strengthens the composite when added as described herein. In one preferred embodiment, the degree of substitution is selected in a range from 1–3 weight percent. In another preferred embodiment, the degree of subsitiution is selected in a range from 1.5–2.5 percent.

The strength enhancing ability of particular type of substituted starch is dependent upon the viscosity of the starch as well as the degree of substitution. The effect of viscosity on the strength enhancement of substituted starches was explored using commercially available starches as well as starches prepared in the laboratory. Starches with various viscosities due to different degrees of acid-thinning were substituted to the same degree in order to determine the optimum viscosity for strength enhancement. Acid-modified starches from Grain Processing Corp designated as C68F, C165, C150, C140, C124, and C110 were each substituted with approximately 2.3 wt % hydroxypropyl (HP) groups using a standard substitution reaction scheme. The substitution level of the starches was analyzed by digestion and gas chromatography. The starch samples were added at 2 wt % of stucco to a standard wallboard formulation which were then tested for nail pull resistance and normalized to control samples to determine the amount of strength improvement. The results can be found in Table 1. Viscosity is presented as the solids content of the starting material required to achieve a cooked viscosity of 1000 cps at 150 F. Starches with higher "wt % solids at 1000 cps" have lower viscosity.

TABLE 1

ICBM substituted HP starch performance vs viscosity

| Designation | HP Substitution Wt % | Wt % Solids at 1000 cps | 2% Nail Pull Improvement |
|---|---|---|---|
| C110 | 2.2 | 9 | 13% |
| C124 | 2.4 | 11 | 17% |
| C140 | 2.1 | 14 | 23% |
| C150 | 2.3 | 17.5 | 26% |
| C165 | 2.3 | 20 | 26% |
| C68F | 2.3 | 22.5 | 17% |

Commercially available hydroxyethylated (HE) starches of different viscosities were added at 2 wt % of stucco to wallboard samples to evaluate their strength enhancing properties. Tested samples included a series of Ethylex starches from AE Staley Co and a series of Coatmaster starches from Grain Processing Corp. Again, the substitution level was determined for each sample. The results can be found in Tables 2 and 3. Viscosity data is taken from the literature as the solids content required to achieve a cooked viscosity of 1000 cps at 150 F for Coatmaster and at 95 F for Ethylex.

TABLE 2

Coatmaster HE starch performance vs viscosity

| Designation | HE Substitution Wt % | Wt % Solids for 1000 cps (150 F) | 2% Nail Pull Improvement |
|---|---|---|---|
| K500 | 1.39 | 4 | 7% |
| K540 | 1.81 | 17 | 18% |
| K560 | 1.63 | 21 | 27% |
| K570 | 2.05 | 25 | 21% |
| K580 | 2.02 | 30 | 19% |
| K92F | 2.37 | 43 | 14% |

TABLE 3

Ethylex HE starch performance vs viscosity

| Designation | HE Substitution Wt % | Wt % Solids for 1000 cps (95 F) | 2% Nail Pull Improvement |
|---|---|---|---|
| 2095 | 2.12 | 7.5 | 2% |
| 2065 | 1.81 | 15 | 29% |
| 2035 | 2.24 | 17.5 | 22% |
| 2015 | 2.05 | 27.5 | 16% |

Table 2 shows that a range of weight percent solids of from 17–30 for 1000 cps at 150° F. is preferred. More preferably, the range is 17–21 weight percent solids.

The data collected from laboratory and commercial HE and HP starches with similar DS and varying viscosity, or degree of acid-modification, indicates that peak performance comes at an intermediate viscosity. For dent corn starch ethers, strength enhancement is greatest at a degree of acid-thinning that gives 1000 cps viscosity for around 20 wt % solids at 150 F. (Note: Ethylex viscosity is represented at a lower temperature, therefore viscosity at 150 F would be lower and wt % solids for 1000 cps would be higher, resulting in a correspondence between peak viscosities.) It is believed that this intermediate viscosity allows dissolution and diffusion throughout the inorganic matrix without causing excessive migration to the surface of the composite material. Optimum viscosity may vary depending on stucco type and quality as well as processing conditions such as water-to-stucco ratio and drying rate and temperature.

Iodine solution staining was used to identify the location of the substituted starch polymer in the gypsum core. An iodine solution was prepared by dissolving iodine (I2) chips in isopropyl alcohol and water at room temperature. Wallboard samples to be analyzed were cross-sectioned using a technique similar to "score-and-snap," in which one paper facing was partially cut, with care not penetrate the core, and the samples broken evenly. The iodine solution was then applied liberally to the broken faces of the samples. The solution was given several minutes to hydrate and complex with the starch in the sample. The stained samples were then examined under a stereo microscope and the tint, hue, and location of the stained starch was noted.

Starch staining results were related to molecular composition in order to further explain trends in performance. Several key attributes were identified to characterize starch behavior in samples after drying. Wallboard samples were primarily characterized by the tint of stain in the bulk of the gypsum matrix, the size and tint of granular particles within the matrix, and the thickness of darker tint at the drying faces of the sample.

Wallboard samples that were not heated to above the gel temperature of the incorporated starches were found to have no stain in the core or at the faces and finely delineated particles within the core. In this case, the board core and starch throughout never reach a high enough temperature to dissolve the starch. The starch remains as granules that neither swell nor disperse.

Samples containing substituted starches with high viscosity had a light tint in the core, very little stain at the faces, and larger, more diffuse particles within the core. Here, the starches reached their gel temperature and began to dissolve. The starch granules then either remained in the swollen state or burst but diffused slowly due to high starch viscosity.

Samples with substituted starches of low viscosity had light tint in the core with thick, dark staining along the faces. These starches became fully dissolved and formed a molecular dispersion but then migrated toward the faces during drying. The degree of migration was indicated by the thickness of the stain along the paper facing.

Samples with substituted starches of the proper viscosity had dark staining throughout the core. In these samples, the starch granules dissolved and diffused through the gypsum matrix but did not migrate significantly to the faces during drying. Although these samples may have had some stains indicating remnants of granules and/or thin, concentrated layers at the faces, the starch was substantially dispersed throughout the gypsum composite.

Viscosity was also found to be critical to performance in other types of substituted starches such as starch-esters. For example, a commercially available hydrophobically modified acid-thinned waxy maize starch, Filmkote 54 from National Starch and Chemical Co, imparted excellent nail pull performance at low levels of addition in a wallboard samples. However, its high viscosity counterpart, Filmkote 550, gave little or no improvement. Likewise, an unmodified starch, B20F from Grain Processing Corp, which was substituted with a low degree of hydroxypropyl groups and added to a wallboard sample did not dissolve or increase strength When the same substituted starch was acid-thinned, however, and added to a wallboard sample, it greatly improved the nail pull resistance.

Optimum viscosity is necessary but not sufficient for substituted starch strength-enhancing performance. The starch must also have the proper degree of substitution. If the substitution is too low, gel temperature, viscosity characteristics, and film-forming ability are not altered enough to improve composite strength. When substituted to too high a degree, the starch becomes cold water soluble, in which case it affects slurry viscosity and stucco hydration and does not significantly improve strength. These effects were demonstrated by substituting acid-thinned dent corn starch, Wallboard Binder from AE Staley, with various amounts of HE substitution. The samples were added to wallboard formulations which were tested for nail pull resistance in order to determine the amount of strength enhancement, which is outlined in Table 4.

TABLE 4

ICBM HE starch performance vs substitution

| Substitution Type | Substitution Wt % | 2% Nail Pull Improvement |
|---|---|---|
| HE | 0.03% | 7% |
| HE | 2.52% | 22% |
| HE | 11.43% | 9% |

Even when the amount of substitution is within the range to make a starch cold water soluble with lowered gel temperature, degree of substitution can affect strength enhancement. It is believed that the DS affects the starch film properties and affinity to the inorganic matrix, which is, in this case, gypsum crystals. Starches were produced with increasing amounts of HP substitution. Again, wallboard samples were made with 2 wt % additive of these starches and mechanically tested. A peak in nail pull performance was found between 1.5 and 2.5 wt % HP. A similar trend was found for starch-esters. Acetylated and butyrylated samples were made with increasing amounts of substitution, below the limit of cold water solubility. Maximum strength-enhancing ability was achieved with samples of intermediate substitution.

The type of starch that is substituted can also affect dissolution and performance. Waxy maize corn, which is composed of the branched form of starch, amylopectin, generally provides superior strength enhancement when modified or substituted with a variety of groups. This is believed to be due to the strong affinity of amylopectin to inorganics, such as gypsum crystals. The interaction was demonstrated by adding pre-dissolved, acid-thinned waxy maize corn to a slurry of stucco. The solution, which was not high viscosity, prevented the stucco from setting into gypsum. This was probably due to amylopectin coordinating to surface of the growing gypsum crystals, preventing their growth When modified or substituted amylopectin starch is not pre-dissolved or cold water soluble, this is not a problem because stucco set occurs before starch dissolution.

Potato starch can also be substituted to produce a strength enhancing additive for inorganic composites. It was found that substituted potato starches of the preferred viscosity and substitution impart good strength enhancement but with different dissolution characteristics. Many of the granules remain intact after drying of the composite. This could be due to the larger granules and higher amylose in potato starches. It is believed that a fraction of the substituted starch leaches out of the granules into the matrix and is responsible for the majority of the strength enhancement. Tapioca starch, and conceivably any other native starch source, can also become strength-enhancing when adjusted to the proper viscosity and substituted within a given DS. Selection of the type of strength-enhancing starch to use in a given composition depends largely on their performance to addition and performance to cost ratio.

The substituted starches of the inventive compositions are particularly attractive due to their effective strength enhancement and low cost. They can be used at low levels to improve the strength of gypsum wallboard at current board weights or to reduce the weight of wallboard without sacrificing strength. In either of these cases, the cost effectiveness of strength-enhancing starches is of primary importance. The increased cost of substituting a starch is offset by the improvement in strength enhancing characteristics. Significantly less of a substituted starch can be added to a composite to achieve the same effect as a less effective starch or additive. The overall performance to cost ratio is therefore greater with substituted starches than with other strength enhancing additives.

A desired additive level for reducing the weight and cost of gypsum wallboard can be found using simple cost analysis. Increase in the strength to weight ratio of the gypsum core and composite sandwich structure allow the production of lighter weight boards with the same nail pull resistance. The lighter weight boards contain less material in the core which results in more cost savings than cost added by the starch. However, the benefits of adding a strength-enhancing starch generally level off at higher additive levels. At some point, the added cost of the starch begins to outweigh the weight reducing ability and resulting cost savings. For example, an HE starch can be used to reduce the minimum board weight to pass ASTM nail pull standards from 1550 lbs/MSF to 1400 lbs/MSF at 1.5 wt % stucco addition with a 3% manufacturing cost savings.

In other cases, the performance per additive is more important, such as in the case of high performance construction boards. These boards typically contain a higher percentage of strength enhancing additives. When higher levels of organic additives are added to a composite, other factors such as fire and mold resistance become important. Fire resistance is a key benefit of inorganic compositions, particularly gypsum wallboard, which should not be compromised by additives. Fire-resistant additives, such as phosphates, may be included in the composition but are often expensive. Mold susceptibility is a more recent concern that must be addressed in construction materials. The use of a high level of organic components often significantly decreases the mold resistance of a composite and requires the addition of anti-microbial agents. Therefore, it may be an advantage to keep the organic strength enhancing additive at as low a level as possible that achieves the desired mechanical properties. In this case, the strength performance to additive ratio is of importance when selecting a strength enhancing agent.

Strength enhancing starches may also be combined with other additives to improve performance. Starches, when added as the sole enhancing additive in wallboard, increase the hardness and nail pull resistance of the board, but may also make the gypsum more brittle. Other additives can be added to complement the effect of the substituted starch. For example, substituted starches may be combined with strength enhancing cellulose ethers in inorganic composites. Certain cellulose ethers are known to improve the toughness and flexural strength of inorganic composites and can be used to counter the brittle nature imparted by the starch. When used in combination in wallboard, the result is improved nail pull resistance, flexural strength, hardness, and toughness of the board. In some cases, the combined mechanical performance of the cellulose ether and substituted starch is greater than the sum of the individual performances.

Fibers may also be included in the composite to improve flexural strength, toughness, and abuse-resistance. It is known that fibers reduce damage caused by handling, installation, and use of brittle, inorganic composites. It is believed that small additions of cellulose ethers in the composite helps to bind the fibers to the inorganic matrix and increases their pull-out strength. This results in much better performance than when ether fibers or cellulose ether alone are added to the composite. In one preferred embodiment, glass fibers are added due to their high strength, low cost, and fire-resistance.

In one embodiment, substituted starch, cellulose ether, and glass fibers are added at 10 wt %, 2 wt %, and 2 wt % stucco respectively. The resulting slurry was cast into a ¼ inch sheet with no facing material and dried in a two-stage procedure. The resulting board had good nail pull resistance and flexural strength at low board weight and excellent abrasion resistance. Similar formulations may include a water resistant additive, such as a paraffin wax emulsion. An anti-fungal agent may also be added to reduce mold susceptibility. Finally, the dried boards may be coated with a priming material such as an acrylic or vinyl acetate ethylene copolymer emulsion to facilitate later painting or finishing.

EXAMPLES

Control Sample 1: Acid-modified Dent Corn Starch (Hi Bond)

Dry ingredients including 1000 g stucco, 10 g Hi Bond acid-modified dent corn starch from Bunge Milling, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Control Sample 2: Acid-modified Dent Corn Starch (Wallboard Binder)

Dry ingredients including 1000 g stucco, 10 g Wallboard Binder acid-modified dent corn starch from AE Staley, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 200 C convection oven. The sample was dried to 75% of its original weight and then placed in a 50 C convection oven until completely dry.

Control Sample 3: Acid-modified Dent Corn Starch (C165)

Dry ingredients including 1000 g stucco, 10 g C165 acid-modified dent corn starch from Grain Processing Corp., and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 200 C convection oven. The sample was dried to 75% of its original weight and then placed in a 50 C convection oven until completely dry.

Control Sample 4: Acid-modified Dent Corn Starch (20 g)

Dry ingredients including 1000 g stucco, 20 g C165 acid-modified dent corn starch from Grain Processing Corp., and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 200 C convection oven. The sample was dried to 75% of its original weight and then placed in a 50 C convection oven until completely dry.

Hydroxyethyl Starches

Dry ingredients including 1000 g stucco, 20 g Coatmaster K55F hyrdoxyethylated, acid-modified dent corn starch from Grain Processing Corporation, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g Coatmaster K54F hyrdoxyethylated, acid-modified dent corn starch from Grain Processing Corporation, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g Coatmaster K56F hyrdoxyethylated, acid-modified dent corn starch from Grain Processing Corporation, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g Coatmaster K57F hyrdoxyethylated, acid-modified dent corn starch from Grain Processing Corporation, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g Coatmaster K58F hyrdoxyethylated, acid-modified dent corn starch from Grain Processing Corporation, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g Coatmaster K500 hyrdoxyethylated, unmodified dent corn starch from Grain Processing Corporation, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g Ethylex 2065 hyrdoxyethylated, acid-modified dent corn starch from AE Staley, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 10 g Ethylex 2065 hyrdoxyethylated, acid-modified dent corn starch from AE Staley, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 30 g Ethylex 2065 hyrdoxyethylated, acid-modified dent corn starch from AE Staley, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g Kollotex hyrdoxyethylated, acid-modified potato starch from Avebe, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g acetylated, acid-modified tapioca starch from Avebe, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Hydroxypropyl Starches

Dry ingredients including 1000 g stucco, 20 g PureCote B760 hydroxypropylated, acid-modified dent corn starch from Grain Processing Corporation, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Dry ingredients including 1000 g stucco, 20 g ICBM SE-24 hydroxypropylated, acid-modified dent corn starch having 2.34% hydroxypropylation, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Hydrophobically Substituted Starch

Dry ingredients including 1000 g stucco, 20 g Filmkote hyrdoxyethylated, acid-modified waxy maize starch from National Starch, and 10 g ground gypsum accelerator were thoroughly mixed together. This mixture was then added to 1200 g warm (102 F) tap water with two drops of set retarder in a 4 L Waring blender. The combination was blended for 10 seconds on "low" setting. The resulting slurry was poured into a paper envelope within a 12"×12"×½" horizontal mold and the surface was compressed to ½" with a glass plate. The sample fully set within ten minutes and was removed from the mold and placed in a 250 C convection oven. The sample was dried to 75% of its original weight and then placed in a 50 C convection oven until completely dry.

Hydroxyethyl Control Sample/Uniroc Example 1

Uniroc Example 1. Dry ingredients including 1000 g stucco, 200 g Coatmaster K57F hyrdoxy-ethylated starch from Grain Processing Corporation, 10 g ground gypsum accelerator, and 5 g sulfonated melamine-formaldehyde dispersant were thoroughly mixed together. This mixture was then added to 1200 g cold (60 F) tap water with two drops of set retarder in a 4 L Waring blender. The combination was blended for 10 seconds on "low" setting. The resulting slurry was poured into a 10"×12"×¼" mold and the surface was leveled with a doctor blade. The sample fully set within ten minutes and was removed from the mold and placed in a 200 C convection oven. The sample was dried to 75% of its original weight and then placed in a 50 C convection oven until completely dry.

Glass Fiber

Uniroc Example 2. Dry ingredients including 1000 g stucco, 200 g Coatmaster K57F hyrdoxy-ethylated starch from Grain Processing Corporation, 20 g ½" chopped glass *strand*, 5 g sulfonated melamine-formaldehyde dispersant, and 2 g ground gypsum accelerator were thoroughly mixed together. This dry mixture was then added to 1300 g cold (60 F) tap water with two drops of set retarder in a 4 L Waring blender. The combination was blended for 10 seconds on "low" setting. The resulting slurry was poured into a 10"×12"×¼" mold and the surface was leveled with a doctor blade and covered with a glass plate. The sample fully set within ten minutes and was removed from the mold and placed in a 200 C convection oven. The sample was dried to 75% of its original weight and then placed in a 50 C convection oven until completely dry.

Uniroc Example 3. Dry ingredients including 1000 g stucco, 100 g Coatmaster K57F hyrdoxy-ethylated starch from Grain Processing Corporation, 15 g ½" chopped glass strand, 5 g sulfonated melamine-formaldehyde dispersant, and 2 g ground gypsum accelerator were thoroughly mixed together. This dry mixture was then added to 1300 g cold (60 F) tap water with two drops of set retarder in a 4 L Waring blender. The combination was blended for 10 seconds on "low" setting. The resulting slurry was poured into a 10"×12"×¼" mold and the surface was leveled with a doctor blade. The sample fully set within ten minutes and was removed from the mold and placed in a 200 C convection oven. The sample was dried to 75% of its original weight and then placed in a 50 C convection oven until completely dry.

Uniroc Example 4 (with cellulose ether). Dry ingredients including 1000 g stucco, 100 g Coatmaster K57F hyrdoxy-ethylated starch from Grain Processing Corporation, 20 g ½" chopped glass strand, 20 g surface-treated hydroxylethyl methylcellulose with delayed solubility (HEMC 15 kPFR) from Culninal, 5 g sulfonated melamine-formaldehyde dispersant, and 2 g ground gypsum accelerator were thoroughly mixed together. This dry mixture was then added to 1300 g cold (60 F) tap water with two drops of set retarder in a 4 L Waring blender. The combination was blended for 10 seconds on "low" setting. The resulting slurry was poured into a 10"×12"×¼" mold and the surface was leveled with a doctor blade and covered with a glass plate. The sample fully set within ten minutes and was removed from the mold and placed in a 200 C convection oven. The sample was dried to 75% of its original weight and then placed in a 50 C convection oven until completely dry.

Uniroc Example 5 (Wood Fibers). Dry ingredients including 1000 g stucco, 200 g Coatmaster K57F hyrdoxy-ethylated starch from Grain Processing Corporation, 60 g wet recycled paper pulp (20 g dry fiber), 5 g sulfonated melamine-formaldehyde dispersant, and 5 g ground gypsum accelerator were thoroughly mixed together. This dry mixture was then added to 1300 g cold (60 F) tap water with two drops of set retarder in a 4 L Waring blender. The combination was blended for 10 seconds on "low" setting. The resulting slurry was poured into a 10"×12"×¼" mold and the surface was leveled with a doctor blade. The sample fully set within ten minutes and was removed from the mold and placed in a 200 C convection oven. The sample was dried to 75% of its original weight and then placed in a 50 C convection oven until completely dry.

Uniroc Example 6 (Glass & Wood Fibers with Cellulose Ether). Dry ingredients including 1000 g stucco, 100 g Coatmaster K57F hyrdoxy-ethylated starch from Grain Processing Corporation, 30 g wet recycled paper pulp (10 g dry fiber), 20 g surface-treated hydroxylethyl methylcellulose with delayed solubility (HEMC 15 kPFR) from Culminal, 10 g ½" chopped glass strand, 5 g sulfonated melamine-formaldehyde dispersant, and 2 g ground gypsum accelerator were thoroughly mixed together. This dry mixture was then added to 1300 g cold (60 F) tap water with two drops of set retarder in a 4 L Waring blender. The combination was blended for 10 seconds on "low" setting. The resulting slurry was poured into a 10"×12"×¼" mold and the surface was leveled with a doctor blade and covered with a glass plate. The sample fully set within ten minutes and was removed from the mold and placed in a 200 C convection oven. The sample was dried to 75% of its original weight and then placed in a 50 C convection oven until completely dry.

TABLE 5

Summary of ICBM Substituted Starches

| ICBM # | Trade Name | Source | Type | Substitution Type | wt % | Conc./ rpm | Peak | Trough | Final | Gel T |
|---|---|---|---|---|---|---|---|---|---|---|
| 1 | Wallboard Binder | AE Staley | acid-thinned dent corn | HE | 0.03% | | not tested | | | |
| 2* | Wallboard Binder | AE Staley | acid-thinned dent corn | HE | 11.43% | | not tested | | | |
| 3 | Wallboard Binder | AE Staley | acid-thinned dent corn | HE | 2.52% | 20% | 1500 | 150 | 1000 | 75 |
| 4 | Amylogel 03001 | Cargill | high amylose (70%) | HE | 5.23% | | no gelation even at high concentration | | | |
| 5 | Amylogel 03003 | Cargill | high amylose (50%) | HE | 2.60% | 10% | 1100 | 1050 | 1830 | 84 |
| 6 | Cargill Gel 03420 | Cargill | waxy maize | HE | 2.97% | 5% | 650 | 350 | 700 | 77 |
| 7 | Tapon | National Starch | acid-thinned waxy maize | HE | 3.04% | 40% | 65 | 40 | 100 | 74 |
| 8 | Cargill Gel 03420 | Cargill | waxy maize | HE | 2.73% | 5% | 270 | 200 | 300 | 79 |
| 9 | C165 | GPC | acid-thinned dent corn | HP | 1.10% | 20% | 850 | 75 | 750 | 74 |
| 10 | C165 | GPC | acid-thinned dent corn | HP | 1.22% | 20% | 325 | 25 | 300 | 77 |
| 11 | C165 | GPC | acid-thinned dent corn | acetyl | increasing | 20% | 1000 | 175 | 525 | 78 |
| 12 | C165 | GPC | acid-thinned dent corn | acetyl | V | 20% | 600 | 75 | 325 | 76–77 |
| 13 | C165 | GPC | acid-thinned dent corn | acetyl | V | 20% | 800 | 75 | 475 | 78 |
| 14 | C165 | GPC | high amylose (70%) | benzo | | 20% | 325 | 275 | 275 | 82 |
| 15 | C165 | GPC | high amylose (50%) | acetyl | | 10% | 125 | 100 | 100 | 88 |
| 16 | C165 | GPC | acid-thinned dent corn | butyryl | increasing | 20% | 525 | 125 | 250 | 79 |
| 17 | C165 | GPC | acid-thinned dent corn | butyryl | V | 20% | 575 | 100 | 225 | 80 |
| 18 | C165 | GPC | acid-thinned dent corn | butyryl | V | 20% | 375 | 150 | 375 | 76 |
| 19 | C165 | GPC | acid-thinned dent corn | HP | 2.30% | 20% | 530 | 30 | 600 | 78 |
| 20 | B20F | GPC | unmodified dent | HP | 3.61% | 8% | 1675 | 1075 | >2500 | 76 |
| 20A | ICBM SE 20 | ICBM | HP dent corn | acid-thinned | 1.72% | 8% | 150 | 15 | 75 | 77 |
| 21 | C165 | GPC | acid-thinned dent corn | HP | 3.09% | 20% | 450 | 30 | 600 | 77 |
| 22 | C165 | GPC | acid-thinned dent corn | HP | 0.31% | 20% | 375 | 60 | 2375 | 80 |
| 23* | C165 | GPC | acid-thinned dent corn | HP | 12.75% | 20% | 80 | 25 | 175 | 75? |
| 24 | C150 | GPC | acid-thinned dent corn | HP | 2.34% | 20% | 1500 | 100 | 1375 | 74 |
| 25 | C68F | GPC | acid-thinned dent corn | HP | 2.33% | 20% | 110 | 7.5 | 75 | 81 |
| 26 | C140 | GPC | acid-thinned dent corn | HP | 2.07% | 20% | 1600 | 320 | 2250 | 77 |
| 27 | C165 | GPC | acid-thinned dent corn | HP | 0.44% | 20% | 325 | 40 | 2400 | 77 |
| 28 | C165 | GPC | acid-thinned dent corn | HP | 3.21% | 20% | 410 | 30 | 350 | 74 |
| 29 | C124 | GPC | acid-thinned dent corn | HP | 2.39% | 20% | 2280 | 570 | >2400 | 76 |
| 30 | C110 | GPC | acid-thinned dent corn | HP | 2.20% | 8% | 732 | 162 | 505 | 79 |
| 31 | C165 | GPC | acid-thinned dent corn | HP, Me | 0.24%, 0.92% | 20% | 215 | 35 | 112 | 78 |
| 32 | C165 | GPC | acid-thinned dent corn | Me | 1.03% | 20% | 82 | 38 | 105 | 79 |

*Cold Water Soluble

What is claimed is:

1. An organic-inorganic composite comprises:

a substituted starch having a degree of substitution of at least one substituent group;

an inorganic phase; and water, wherein the inorganic phase, the substituted starch and the water are mixed together to form a mixture, the inorganic phase is at least partially hydrated by the water, and the degree of substitution and the at least one substituent group are selected such that the substituted starch is not soluble during mixing at a mixing temperature but at least partially dissolves as the temperature increases during processing of the mixture and forms a film substantially dispersed throughout the organic-inorganic composite wherein the organic-inorganic composite is substantially strengthened.

2. The organic-inorganic composite of claim 1, wherein the at least one substituent group is selected from substituent groups consisting of an ether substituent group and an ester substituent group.

3. The organic-inorganic composite of claim 2, wherein the at least one substituent group is selected from substituent groups consisting of an ester substituent group.

4. The organic-inorganic composite of claim 2, wherein the at least one substituent group is selected from substituent groups consisting of an ether substitutent group.

5. The organic-inorganic composite of claim 1, wherein the at least one substituent group is selected from substituent groups consisting of an alkyl substituent group, an ethyl succinate substituent group, a cationic substituent group, an anionic substituent group, and combinations thereof.

6. The organic-inorganic composite of claim 1, wherein the substituted starch is hydroxyethylated, hydroxypropylated, or acetylated.

7. The organic-inorganic composite of claim 1, wherein the at least one substituent group is selected such that the substituted starch is film-forming and hydrophilic such that the substituted starch forms a film on the hydrated inorganic phase.

8. The organic-inorganic composite of claim 1, wherein the substituted starch forms a percolating, polymeric film.

9. The organic-inorganic composite of claim 1, wherein the at least one substituent group and the degree of substitution is selected such that a weight percent solids at a viscosity of 1000 cps is at least 4 percent.

10. The organic-inorganic composite of claim 9, wherein the at least one substituent group and the degree of substitution is selected such that a weight percent solids at a viscosity of 1000 cps and a temperature of 150 degrees Fahrenheit is in a range from 9 percent to 43 percent.

11. The organic-inorganic composite of claim 9, wherein the at least one substituent group is a hydroxypropyl group and the degree of substitution is selected such that a weight percent solids at a viscosity of 1000 cps and a temperature of 150 degrees Fahrenheit is in a range from 14 percent to 20 percent.

12. The organic-inorganic composite of claim 11, wherein the at least one substituent group is a hydroxyethyl group and the degree of substitution is selected such that a weight percent solids at a viscosity of 1000 cps and a temperature of 150 degrees Fahrenheit is in a range from 17 percent to 30 percent.

13. The organic-inorganic composite of claim 12, wherein the degree of substitution of the hydroxyethyl group is selected such that a weight percent solids at a viscosity of 1000 cps and a temperature of 150 degrees Fahrenheit is in a range from 17 percent to 21 percent.

14. The organic-inorganic composite of claim 12, wherein the degree of substitution is less than 0.3.

15. The organic-inorganic composite of claim 12, wherein the degree of substitution is less than 6 weight percent.

16. The organic-inorganic composite of claim 12, wherein the degree of substitution is selected in a range from 1 to 3 weight percent.

17. The organic-inorganic composite of claim 1, wherein the substituted starch is at least partially comprised of amylopectin.

18. The organic-inorganic composite of claim 17, wherein the substituted starch is substantially amylopectin.

19. The organic-inorganic composite of claim 1, wherein substantially all of the substituted starch is dissolved and forms a polymeric film.

20. The organic-inorganic composite of claim 1, wherein the substituted starch is of a hydrophobically-modified, acid-thinned waxy maize starch.

21. The organic-inorganic composite of claim 1, wherein the substituted starch is of an acid-thinned starch and the at least one substituent group is of an hydroxypropyl group.

22. The organic-inorganic composite of claim 21, wherein the degree of substitution is selected in a range from 1.5 to 2.5 weight percent hydroxypropyl.

23. The organic-inorganic composite of claim 1, wherein the substituted starch is of an acetylized, acid-thinned waxy maize starch.

24. The organic-inorganic composite of claim 1, wherein the amount of substituted starch is no greater than 2 weight percent of the weight of the substituted starch and inorganic phase.

25. The organic-inorganic composite of claim 1, further comprising fibers dispersed substantially throughout the organic-inorganic composite.

26. The organic-inorganic composite of claim 25, wherein the fibers are glass fibers.

27. The organic-inorganic composite of claim 1, further comprising a cellulose ether additive selected such that a synergistic improvement in flexural strength is achieved.

28. The organic-inorganic composite of claim 27, wherein the cellulose ether is selected from the group of cellulose ethers consisting of hydroxypropylmethyl cellulose, methyl cellulose, hydroxyethylmethyl cellulose, hydroxyethyl cellulose, hydroxypropyl cellulose, cationic cellulose, carboxymethyl cellulose and combinations thereof.

29. The organic-inorganic composite of claim 28, wherein the cellulose ether is of hydroxpropylmethyl cellulose.

30. A method of preparing an organic-inorganic composite article using a process having a mixing temperature range, the method comprising:
  selecting a substituted starch having a degree of substitution, a degree of polymerization and at least one substituent group, such that the substituted starch is insoluble in water in the mixing temperature range;
  mixing the substituted starch, an inorganic phase and water in a continuous process at a temperature within the mixing temperature range;
  forming the composite article;
  hydrating at least a portion of the inorganic phase;
  raising the temperature above the mixing temperature range, wherein the substituted starch at least partially dissolves in the water; and
  setting and drying the composite article such that the substituted starch forms a continuous polymeric film within the composite article.

* * * * *